Patented Sept. 14, 1948

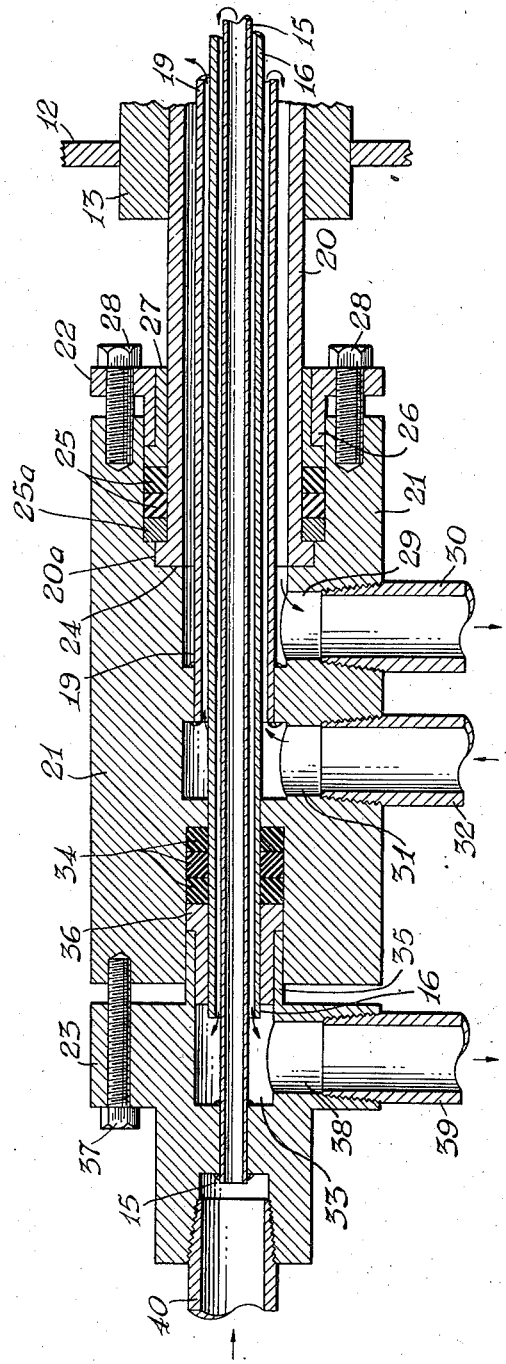
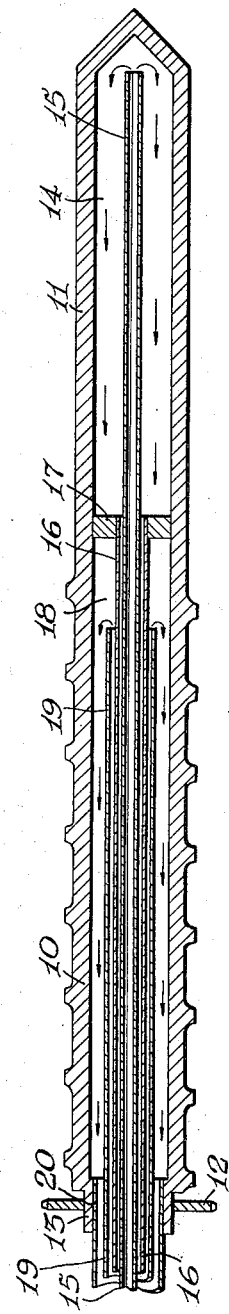

2,449,355

UNITED STATES PATENT OFFICE 2,449,355

INTERNAL TWO-ZONE HEAT CONTROL FOR PLASTICS EXTRUDERS

Ralph M. Wiley, Midland, and Edward V. Dettmer, Bay City, Mich., assignors to The Dow Chemical Company, Midland, Mich., a corporation of Delaware Application July 28, 1947, Serial No. 764,134

1 Claim. (Cl. 18—12)

This invention relates to an apparatus for controlling separately the temperatures in each of two sections of a rotating screw and torpedo in an extruder for organic thermoplastic materials.

It is well-known that extrusion of many organic thermoplastics is facilitated by keeping the plastic feed relatively cool until it is well compressed by the feed screw and then suddenly increasing its temperature above the fusion point while it traverses the final section of the extrusion apparatus. This is especially true of those plastics which have rather sharp fusion temperatures and which tend to decompose on prolonged heating above such temperatures. The usual means employed for effecting the two-stage conditioning of the plastic feed has been a jacketed extruder barrel, in one section of which there is circulated water or low pressure steam and in another section of which there is circulated steam at a higher pressure, or other suitable heat transfer fluid.

While it is highly desirable to heat the jacket of the extruder barrel, and to do so in two separately controlled zones as has been done heretofore, a decided improvement in operation could be obtained if the screw and torpedo within the barrel could be divided similarly into separately controlled temperature zones. This is made difficult by the fact that the screw and the torpedo are usually integral with one another, and turn together during operation of the apparatus. No great difficulty is encountered in heating both the screw and torpedo to the same temperature, but the problem still remains of providing a practical means for heating different parts of the screw-torpedo unit to different temperatures.

It is an object of the present invention to provide an apparatus whereby separately controlled temperatures may be had in different portions of the feed screw and torpedo of a plastics extrusion machine. A particular object is to provide such an apparatus whereby steam or other appropriate heating fluid may be admitted at separately controlled temperatures to each of two zones within the screw-torpedo unit of a plastics extruder without interfering with the ability of that unit to rotate.

The invention, in one specific embodiment, consists of a hollow rotatable feed screw for a plastics extruder; a longitudinally bored block coaxial with and disposed rearwardly of the screw, being chambered at each end to receive the slip rings and bushing of a stuffing box, and being radially bored near its center to provide two passages communicating with its central bore; a centrally bored gland at the forward end of and secured to the block, coaxial therewith; another centrally bored gland at the rearward end of and secured to the block, coaxial therewith, and radially bored to provide a passage communicating with its central bore; a non-rotatable pipe open at both ends, coaxial with and extending through the two glands and the intervening block and to a point near the forward or discharge end of the hollow rotatable screw member; a second, larger open pipe, coaxial with the first, extending from the forward end of the rear gland, through the block and the front gland, into the screw, terminating at a desired line of division between separately controlled temperature zones within the screw and secured to the screw at the forward end of said pipe so as to form a seal between the two said zones, said pipe being rotatable with the screw; slip rings and a retaining bushing about said second pipe within the rear chamber of the block, to permit rotation of the pipe and to provide a seal for the centro-radial passage in the rear gland; a third, larger open pipe, coaxial with the others, extending from the rear centro-radial passage in the block, through the forward chamber thereof, to a point near and behind the seal between the two temperature zones; a fourth, larger open pipe, coaxial with the others, extending from the forward chamber of the block, through the forward gland, and secured to the rear end of the screw, providing communication between the hollow screw and the forward centro-radial passage in the block, and being rotatable with the screw; and slip rings and a retaining bushing about said fourth pipe, held in the forward chamber of the block by the said forward gland.

The invention will now be described with reference to the accompanying drawing, wherein Fig. 1 is a diagrammatic view in longitudinal section through an extruder screw and torpedo divided into two temperature control zones and showing the arrangement of heating pipes therein; and Fig. 2 is a more detailed view of the drive end of such a screw and of the co-operating elements whereby two-zone heat control is obtained in the rotating screw unit.

A hollow feed screw 10 which may have a smooth torpedo member 11 at its forward, or discharge, end may be divided into two zones for separate control of heat thereto, by means of the invention. Screw 10 is driven by any suitable means, such, for example, as a chain drive (not shown) about sprocket 12 attached to the butt 13 of screw 10. Steam or other heating fluid may be admitted to the forward heating zone 14 through a small pipe 15 coaxial with screw 10 and extending thereinto nearly to the forward end of zone 14, and may be withdrawn or released from zone 14 through a larger coaxial pipe 16 which extends only to the rear boundary of zone 14 and which is there sealed to screw 10 through a centrally bored partition 17 or by means of a heat-resistant packer, to prevent escape of heating fluid from forward zone 14 to the rear zone 18. Similarly, heating fluid may be admitted to the rear heating zone 18 in screw 10 through a third, larger pipe 19 coaxial with pipes 15 and 16, and extending into zone 18 nearly to partition or packer 17, and may be withdrawn therefrom through yet a fourth, larger coaxial pipe 20 which only extends through and is sealed to the butt 13 of screw 10. Thus coaxially nested pipes 15, 16, 19 and 20, of differing lengths, provide the means for controlling separately the temperatures in the two zones 14 and 18. Additional elements are needed, however, to permit screw 10 and pipes 16 and 20, attached thereto, to rotate, and to prevent loss or intermingling of the heating fluids.

Pipes 15, 16, 19 and 20, each of which has been described as extending into screw 10, all project rearwardly from the screw 10 and are supported by longitudinally bored block 21 which is chambered at each end to provide stuffing boxes closed respectively by forward gland 22 and rear gland 23. Pipe 20 extends only to seat 24 of the forward stuffing box and is permitted to rotate therein by self-lubricating packing rings 25. Packing rings 25, one of which may be a slip ring 25a, are held in place against flange 20a on pipe 20 by the compressive action of follower 26 of gland 22, working through bushing 27. Gland 22 may be tightened or loosened as required by adjustment of bolts 28. The annulus between pipes 19 and 20 communicates with a radially bored passage 29 extending through the wall of block 21 and threaded to provide a means of connection with outlet pipe 30 through which heating fluid from zone 18 may be withdrawn for discharge or for reheating and recirculation, as desired. Pipe 19, of greater length and smaller diameter than pipe 20, projects into the body of block 21 beyond radially bored passage 29, and is welded at its terminus to block 21. The annulus between pipe 19 and pipe 16 is in open communication with a second radially bored passage 31 similarly threaded to provide a means of connection with inlet pipe 32 through which heating fluid may be supplied to zone 18.

Pipe 16, of greater length and smaller diameter than pipe 19, projects through the body of block 21, beyond radially bored passage 31, and through the rear stuffing box into a central chamber 33 in the forward face of rear gland 23. Pipe 16 is permitted to rotate by self-lubricating rings 34 which are held in place by the compressive action of follower 35 of gland 23, working through bushing 36. Gland 23 may be tightened or loosened as required by adjustment of bolts 37. The annulus between pipes 16 and 15 communicates with a radially bored passage 38 in gland 23, extending into chamber 33. Passage 38 is internally threaded to provide a means of connection with outlet pipe 39 through which heating fluid from zone 14 may be withdrawn for discharge or for reheating and recirculation, as desired.

Pipe 15, of greater length and smaller diameter than pipe 16, projects rearwardly through chamber 33 in gland 23, and is welded to the body of that gland. Pipe 15 is in communication at the rear of gland 23 with inlet pipe 40 through which heating fluid may be supplied to zone 14.

Inlet pipes 15 and 19, through which heating fluids are supplied at desired temperatures to zones 14 and 18, respectively, are not attached to the rotary screw 10 into which they extend, and are attached to the fixed block 21 or to one of its appurtenant glands 23. These pipes, accordingly, do not rotate in the operation of the apparatus. On the other hand, outlet pipes 16 and 20 are each attached to rotary screw 10 and are rotatable in the stuffing boxes in block 21, so that they are free to, and do, rotate with screw 10 in the operation of the machine. There is no way in which heating fluid to or from one of zones 14 and 18 may become diluted with fluid to or from the other such zone. Since the temperature of each of the fluids supplied to the respective zones may be controlled in any of several well-known manners, the present apparatus provides a means for regulating independently the temperatures in each of two sections of the feed screw or screw-and-torpedo unit in a plastics extruder. When used in co-operation with an extruder barrel having two jacketed sections wherein heating fluids are circulated at the desired temperatures, an effective control is obtained in the plasticity of the material to be extruded.

Pipes 15 and 19 and ports 31 and 40 have been referred to as inlet pipes and ports, respectively, and pipes 16 and 20 and communicating ports 29 and 38 have been referred to as outlet pipes and ports. It should be self-evident that the direction of flow of fluid to either of the heating zones 14 and 18 may be reversed, if desired, and that either one of each pair of co-operating ports may be the inlet while the other is the outlet for fluid to and from the heating zone with which those ports are in communication. It may be especially desirable for the inlets to be pipes 15 and 20 and for the outlets to be pipes 16 and 19, so that there is a double sheath of exhaust fluids about pipe 15, preventing simple heat transfer through a single wall between fluids at the two controlled feed temperatures.

We claim:

The combination with a hollow rotatable feed screw of an extruder for organic thermoplastic materials, of a nest of four concentric pipes extending into and coaxial with the said screw, the innermost pipe extending to the forward end of the screw, the next larger pipe extending to the desired line of division between separately controlled temperature zones within the screw and being there attached to and rotatable with the screw to form a partition between the said zones, the next larger pipe extending to the forward end of the rearwardly disposed heating zone, and the largest pipe opening into and being attached to and rotatable with the butt of the screw, all of said pipes projecting rearwardly from and coaxial with the screw and into the central bore of a non-rotatable block aligned with and displaced from the rear of the screw and having a stuffing box at each end thereof; the largest pipe terminating at the seat of the stuffing box nearest the screw, being rotatably secured therein and in communication with a radially bored port in said block; the next smaller pipe projecting further into and being secured to the block and in communication with a radially bored port in said block; the next smaller pipe projecting through the rear of the block into the gland of the rear stuffing box, being rotatable therein and being in communication with a radially bored port in said gland; and, the innermost pipe extending through said rear gland, being attached thereto, and in communication with a port at the rear face of said gland.

RALPH M. WILEY.
EDWARD V. DETTMER.